US012810085B2

(12) United States Patent
Bleckmann et al.

(10) Patent No.: US 12,810,085 B2
(45) Date of Patent: Nov. 24, 2026

(54) DEVICES FOR INTERCEPTING RADIO FIELD COMMUNICATIONS FOR CONSUMER USE, SYSTEMS CONTAINING THE SAME, AND METHODS OF USE THEREOF

(71) Applicant: Avery Dennison Retail Information Services LLC, Mentor, OH (US)

(72) Inventors: Frederick Bleckmann, Barrington, NH (US); Sergio Shmilovitch, Haifa (IL)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 18/855,528

(22) PCT Filed: Apr. 25, 2023

(86) PCT No.: PCT/IB2023/054227
§ 371 (c)(1),
(2) Date: Oct. 9, 2024

(87) PCT Pub. No.: WO2023/214247
PCT Pub. Date: Nov. 9, 2023

(65) Prior Publication Data

US 2025/0307576 A1 Oct. 2, 2025

Related U.S. Application Data

(60) Provisional application No. 63/479,477, filed on Jan. 11, 2023, provisional application No. 63/382,319, (Continued)

(51) Int. Cl.
*G06K 7/10* (2006.01)
*H04B 5/20* (2024.01)
*H04B 5/45* (2024.01)

(52) U.S. Cl.
CPC ..... *G06K 7/10148* (2013.01); *G06K 7/10386* (2013.01); *H04B 5/20* (2024.01); *H04B 5/45* (2024.01)

(58) Field of Classification Search
CPC ........... G06K 7/10148; G06K 7/10386; G06K 7/10336; G06K 7/10356; G06K 7/10237; (Continued)

(56) References Cited

U.S. PATENT DOCUMENTS 6,611,673 B1 8/2003 Bayley et al.
7,537,166 B2 5/2009 Anson et al.
(Continued)

FOREIGN PATENT DOCUMENTS

AU 2019100428 6/2019
CN 2879282 Y 3/2007
(Continued)

OTHER PUBLICATIONS

International Search Report and Written Opinion dated Jul. 28, 2023 issued in corresponding IA No. PCT/IB2023/054227 filed Apr. 25, 2023.
(Continued)

*Primary Examiner* — Adnan Aziz

(57) ABSTRACT

Consumer-used or consumer-based device that in their native or conventional state or configuration are not able to intercept and decipher/decode radio frequency (RF) signals, but upon modification as described herein can intercept an RF signal from one or more excited/interrogated RFID tags, systems containing the same, and methods of use thereof, are described herein. In some embodiments, the device is modified to include a software controller that limits the functionality of the antenna to receive only and modulates and defines the intercepted RF signal generated by an interrogated RFID tag or label. In some embodiments, the (Continued)

software controller modulates the filtering of the receiver to collect the targeted frequency and for data communication.

37 Claims, 8 Drawing Sheets

Related U.S. Application Data filed on Nov. 4, 2022, provisional application No. 63/337,907, filed on May 3, 2022.

(58) Field of Classification Search
CPC ............... G06K 19/07; G06K 19/0709; G06K 19/0723; G06Q 10/08; G08B 13/2417; H04B 5/20; H04B 5/45; H04B 5/70; H04W 4/80; H04M 1/72412
See application file for complete search history.

(56) References Cited

U.S. PATENT DOCUMENTS

| | | | | |
|---|---|---|---|---|
| 8,122,237 | B2 | 2/2012 | Fuccello | |
| 8,179,261 | B2 | 5/2012 | Frabasile | |
| 8,570,155 | B2 | 10/2013 | Murakami et al. | |
| 8,965,796 | B1 | 2/2015 | Gala | |
| 9,288,623 | B2 * | 3/2016 | Markhovsky | G01S 5/0218 |
| 9,396,368 | B1 | 7/2016 | Lamba et al. | |
| 9,396,424 | B1 | 7/2016 | Loman et al. | |
| 9,665,750 | B2 | 5/2017 | Nikitin et al. | |
| 9,922,304 | B2 | 3/2018 | Debusk et al. | |
| 9,984,262 | B2 | 5/2018 | Schutz | |
| 10,121,185 | B1 | 11/2018 | Orooji | |
| 10,929,625 | B2 | 2/2021 | Graindourze | |
| 2004/0026826 | A1 | 2/2004 | Bergsma et al. | |
| 2005/0062507 | A1 * | 3/2005 | Naffziger | H03L 7/0992 327/105 |
| 2005/0088285 | A1 | 4/2005 | Jei | |
| 2005/0110612 | A1 | 5/2005 | Carrender | |
| 2006/0158310 | A1 | 7/2006 | Klatsmanyi et al. | |
| 2007/0024436 | A1 | 2/2007 | Bandy | |
| 2007/0026826 | A1 * | 2/2007 | Wilson | G06K 19/0723 455/130 |
| 2007/0032224 | A1 | 2/2007 | Boyer et al. | |
| 2007/0066278 | A1 | 3/2007 | Hong | |
| 2007/0120647 | A1 | 5/2007 | Min et al. | |
| 2007/0123167 | A1 | 5/2007 | Lauper | |
| 2007/0141997 | A1 | 6/2007 | Wulff et al. | |
| 2007/0200712 | A1 | 8/2007 | Arneson et al. | |
| 2008/0204238 | A1 | 8/2008 | White | |
| 2009/0036104 | A1 | 2/2009 | Malik | |
| 2009/0036165 | A1 | 2/2009 | Brede | |
| 2009/0128296 | A1 | 5/2009 | Han et al. | |
| 2009/0267767 | A1 | 10/2009 | Chen | |
| 2009/0289776 | A1 * | 11/2009 | Moore | G06Q 20/352 340/10.41 |
| 2010/0013603 | A1 | 1/2010 | Chatani et al. | |
| 2010/0141385 | A1 | 6/2010 | Shiau et al. | |
| 2011/0068903 | A1 | 3/2011 | Hong | |
| 2014/0200051 | A1 | 7/2014 | Liu | |
| 2014/0229246 | A1 | 8/2014 | Ghaffari | |
| 2015/0254677 | A1 | 9/2015 | Huxham et al. | |
| 2016/0012498 | A1 | 1/2016 | Prasad | |
| 2016/0164658 | A1 | 6/2016 | Fraser | |
| 2016/0178727 | A1 | 6/2016 | Bottazzi | |
| 2017/0169263 | A1 * | 6/2017 | Köhler | G06K 7/00 |
| 2018/0121773 | A1 | 5/2018 | Tercsinecz | |
| 2018/0268175 | A1 | 9/2018 | Rietzler | |
| 2018/0367974 | A1 | 12/2018 | Lee | |
| 2021/0020012 | A1 * | 1/2021 | Shakedd | H04B 1/40 |
| 2021/0073484 | A1 * | 3/2021 | Trivelpiece | G06K 7/10158 |
| 2021/0073488 | A1 * | 3/2021 | Turner | G06K 19/07766 |
| 2021/0097826 | A1 | 4/2021 | Trivelpiece et al. | |
| 2021/0127634 | A1 | 5/2021 | Griffioen et al. | |
| 2021/0303807 | A1 * | 9/2021 | DeBusk | G16H 40/20 |
| 2021/0374497 | A1 * | 12/2021 | Syed | G06K 19/073 |
| 2022/0182481 | A1 * | 6/2022 | Schütz | H04B 1/59 |
| 2023/0119392 | A1 | 4/2023 | Wang et al. | |
| 2024/0193381 | A1 * | 6/2024 | Brown, III | G06K 7/10237 |

FOREIGN PATENT DOCUMENTS

| | | | | | |
|---|---|---|---|---|---|
| CN | 101035336 | | | 9/2007 | |
| CN | 100362887 | | | 1/2008 | |
| CN | 201039256 | Y | | 3/2008 | |
| CN | 101253744 | | | 8/2008 | |
| CN | 101493879 | | | 7/2009 | |
| CN | 101820461 | | | 9/2010 | |
| CN | 101826148 | | | 9/2010 | |
| CN | 201622577 | U | | 11/2010 | |
| CN | 201629786 | U | | 11/2010 | |
| CN | 201707686 | U | | 1/2011 | |
| CN | 101986669 | | | 3/2011 | |
| CN | 102104660 | | | 6/2011 | |
| CN | 201985956 | U | | 9/2011 | |
| CN | 202110567 | U | | 1/2012 | |
| CN | 202110569 | U | | 1/2012 | |
| CN | 202120288 | U | | 1/2012 | |
| CN | 102354372 | | | 2/2012 | |
| CN | 102436595 | | | 5/2012 | |
| CN | 102446283 | | | 5/2012 | |
| CN | 102572020 | | | 7/2012 | |
| CN | 202331525 | U | | 7/2012 | |
| CN | 102664998 | | | 9/2012 | |
| CN | 101257672 | | | 12/2012 | |
| CN | 102880890 | | | 1/2013 | |
| CN | 102857631 | | | 2/2013 | |
| CN | 202720665 | U | | 2/2013 | |
| CN | 202748801 | U | | 2/2013 | |
| CN | 202838376 | U | | 3/2013 | |
| CN | 102256018 | | | 6/2013 | |
| CN | 103138785 | | | 6/2013 | |
| CN | 203167016 | U | | 8/2013 | |
| CN | 203243415 | U | | 10/2013 | |
| CN | 101763496 | | | 12/2013 | |
| CN | 203352661 | U | | 12/2013 | |
| CN | 103577775 | | | 2/2014 | |
| CN | 203457214 | U | | 2/2014 | |
| CN | 103870853 | | | 6/2014 | |
| CN | 103971145 | | | 8/2014 | |
| CN | 203838734 | U | | 9/2014 | |
| CN | 204119278 | U | | 1/2015 | |
| CN | 105827761 | | | 8/2016 | |
| CN | 205647629 | U | | 10/2016 | |
| CN | 206686223 | U | | 11/2017 | |
| CN | 207369140 | U | | 5/2018 | |
| CN | 109034295 | | | 12/2018 | |
| CN | 110532827 | | | 12/2019 | |
| CN | 106575347 | | | 9/2020 | |
| DE | 202022001274 | U1 | | 9/2022 | |
| EP | 1571589 | | | 9/2005 | |
| EP | 1887650 | | | 2/2008 | |
| EP | 1941336 | | | 7/2008 | |
| EP | 2335191 | | | 6/2011 | |
| FR | 2969877 | | | 6/2012 | |
| JP | 2003-204286 | | | 7/2003 | |
| JP | 2005-20173 | | | 1/2005 | |
| JP | 2007-150493 | | | 6/2007 | |
| JP | 2008-112260 | | | 5/2008 | |
| JP | 2009251855 | A | * | 10/2009 | |
| JP | 2021-111163 | | | 8/2021 | |
| JP | 2021111163 | A | * | 8/2021 | G06Q 30/06 |
| KR | 10-2006-0003930 | | | 1/2006 | |
| KR | 10-2006-0093965 | | | 8/2006 | |
| KR | 10-2006-0120500 | | | 11/2006 | |
| KR | 10-2007-0071866 | | | 7/2007 | |
| KR | 10-2007-0074016 | | | 7/2007 | |
| KR | 10-0783360 | | | 12/2007 | |
| KR | 10-2008-0025709 | | | 3/2008 | |
| KR | 10-2008-0080976 | | | 9/2008 | |
| KR | 10-2010-0046133 | | | 5/2010 | |
| KR | 10-2015-0064715 | | | 6/2015 | |
| TW | 201443787 | | | 11/2014 | |
| WO | 2006/137740 | | | 12/2006 | |

(56) References Cited

FOREIGN PATENT DOCUMENTS

| | | |
|---|---|---|
| WO | 2012/086412 | 6/2012 |
| WO | 2013/052459 | 4/2013 |
| WO | 2013/148044 | 10/2013 |
| WO | 2015/143731 | 10/2015 |
| WO | 2015/172280 | 11/2015 |
| WO | 2015/189846 | 12/2015 |
| WO | 2017/191590 | 11/2017 |

OTHER PUBLICATIONS

International Preliminary Report on Patentability dated Oct. 29, 2024 issued in corresponding IA No. PCT/IB2023/054227 filed Apr. 25, 2023.

Sharma et al, "RFID based mobiles: Next generation applications," 2010 2nd IEEE International Conference on Information Management and Engineering, https://ieeexplore.ieee.org/abstract/document/5477641.

Byun et al., "ALE-compliant RFID Middleware for Mobile Environment," 2009 10th ACIS International Conference on Software Engineering, Artificial Intelligences, Networking and Parallel/Distributed Computing, https://ieeexplore.ieee.org/document/5286600.

Zhang et al., "Design of Passive RFID Reader Based on Mobile Phone," 2010 Second International Conference on Networks Security, Wireless Communications and Trusted Computing, https://ieeexplore.ieee.org/document/5480868.

Chainway, C71 Built-in RFID Reader (Android 11/13), site visited Jul. 8, 2022, https://www.chainway.net/Products/Info/41.

Pirayesh et al., "mReader: Concurrent UHF RFID Tag Reading," Oct. 2023, https://www.researchgate.net/publication/374751759_mReader_Concurrent_UHF_RFID_Tag_Reading.

Savolainen et al., "EPC UHF RFID Reader: Mobile Phone Integration and Services," 2009 6th IEEE Consumer Communications and Networking Conference, https://ieeexplore.ieee.org/document/4784900.

Nishiyama et al., "Combining RFID Tag Reader with Mobile Phone: An Approach to Realize Everyone's Ubiquitous Appliances," 2006 International Symposium on Intelligent Signal Processing and Communications, https://ieeexplore.ieee.org/document/4212228.

Penttila et al., "Use and interface definition of mobile RFID reader integrated in a smart phone," Proceedings of the Ninth International Symposium on Consumer Electronics, 2005, https://ieeexplore.ieee.org/document/1502402.

Paredes et al., "Compact design of UHF RFID and NFC antennas for mobile phones," Jan. 16, 2017, https://www.semanticscholar.org/paper/Compact-design-of-UHF-RFID-and-NFC-antennas-for-Paredes-Cair%C3%B3/71264956f5e9a28ce2c8227458a87d6d09f8f288#related-papers.

Loeffler et al., "An UHF RFID reader for cell phones," 2010 IEEE International Conference on Wireless Information Technology and Systems, https://ieeexplore.ieee.org/document/5612279.

University of California San Diego, "New technology turns smartphones into RFID readers, saving costs and reducing waste," Feb. 23, 2023, https://www.sciencedaily.com/releases/2023/02/230222115948.htm.

Meyersohm, "Self-checkout annoys some customers and helps shoplifters. Stores are adding it anyway," CNN Business, Dec. 5, 2022, https://www.cnn.com/2022/12/05/business/self-checkout-clothing-stores-kohls-uniqlo.

Matyszczyk, "Supermarkets are taking laughable steps to stop self-checkout theft (customers hate it)," ZDNet Business, Oct. 15, 2022, https://www.zdnet.com/article/supermarkets-are-taking-laughable-steps-to-stop-self-checkout-theft-customers-hate-it/.

Kasula, "Self-Checkout fraud: Balancing customer experience with risk mitigation," Infosys BPM, site visited Jul. 8, 2022, https://www.infosysbpm.com/blogs/bpm-analytics/self-checkout-fraud-balancing-customer-experience-with-risk-mitigation.html.

Patringenaru, Breakthrough Enables Battery-free Smart Tag Technology, Feb. 21, 2023, https://today.ucsd.edu/story/new-technology-turns-smartphones-into-rfid-readers.

* cited by examiner

DEVICES FOR INTERCEPTING RADIO FIELD COMMUNICATIONS FOR CONSUMER USE, SYSTEMS CONTAINING THE SAME, AND METHODS OF USE THEREOF

CROSS-REFERENCE TO RELATED APPLICATIONS

This application is a national stage application under 35 U.S.C. § 371 of international Application No. PCT/IB2023/054227, which was published in English on Nov. 9, 2023, which claims the benefit of U.S. Provisional Patent Application Nos. 63/337,907, filed May 3, 2022, 63/382,319 filed Nov. 4, 2022, and 63/479,477, filed Jan. 11, 2023. The disclosures of each of the foregoing applications are incorporated herein by reference in their entireties.

FIELD

Aspects of the disclosed subject matter relate generally to the field of consumer-based or consumer-used handheld mobile devices, and more particularly to consumer-based or consumer-used handheld mobile devices that are able to intercept and decipher or decode a radio frequency signal or communication containing an electronic product code (EPC) and/or other product/item-specific data.

BACKGROUND

Radio frequency identification (RFID) tags are increasingly used to provide item-level or product-specific data. Such data includes electronic product codes (EPCs), track and trace, inventory management, sustainability data (origin or raw materials, sustainable manufacturing processes, etc.), brand authentication/anti-counterfeiting, theft-prevention, etc. Such information is typically made available by a user scanning an RFID tag with an appropriate handheld and/or fixed reader. The RFID tag may contain additional digital triggers that can direct or redirect the user to a website or other resource to obtain product-specific information.

Currently, use of such data by consumers typically involves scanning a QR code and being directed to a retail brand owner's website to obtain product-specific information. This is due to the fact that conventional consumer-used or consumer-based mobile devices, such as cell/mobile phones, tablets, and smart watches, while able to read certain digital triggers such as QR codes, are not able to read RFID tags directly.

There exists a need for consumer-used or consumer-based devices that can intercept a radio frequency (RF) signal from an RFID tag on a product to obtain the EPC or other product data and associate that data with known product data in order to obtain different types of information about the product.

There exists a need for consumer-used or consumer-based devices that can intercept a radio frequency (RF) signal from an RFID tag on a product to obtain the EPC or other product data and associate that data with known product data in order to obtain different types of information about the product without requiring expensive and/or complex hardware.

Therefore, it is an object of this disclosure to provide consumer-used or consumer-based devices that can intercept a radio frequency (RF) signal from an RFID tag on a product to obtain the EPC or other product data and associate that data with known product data in order to obtain different types of information about the product.

It is further an object of this disclosure to provide consumer-used or consumer-based devices that can intercept a radio frequency (RF) signal from an RFID tag on a product to obtain the EPC or other product data and associate that data with known product data in order to obtain different types of information about the product without requiring expensive and/or complex hardware.

Aspects of the disclosed subject matter address the foregoing and other deficiencies of conventional consumer-used or consumer-based device implementations, providing a solution that both offers the foregoing functionality and does not require expensive or complex hardware components or difficult retrofitting.

FIG. **5*a*** is a schematic showing the relationship between a radio frequency (RF) signal and the unique identification (ID) associated with a radio frequency identification (RFID) tag or label.

FIG. **5*b*** is a schematic showing the conversion of the RF signal generated by the RFID tag or label to a unique binary ID.

Figure 6:
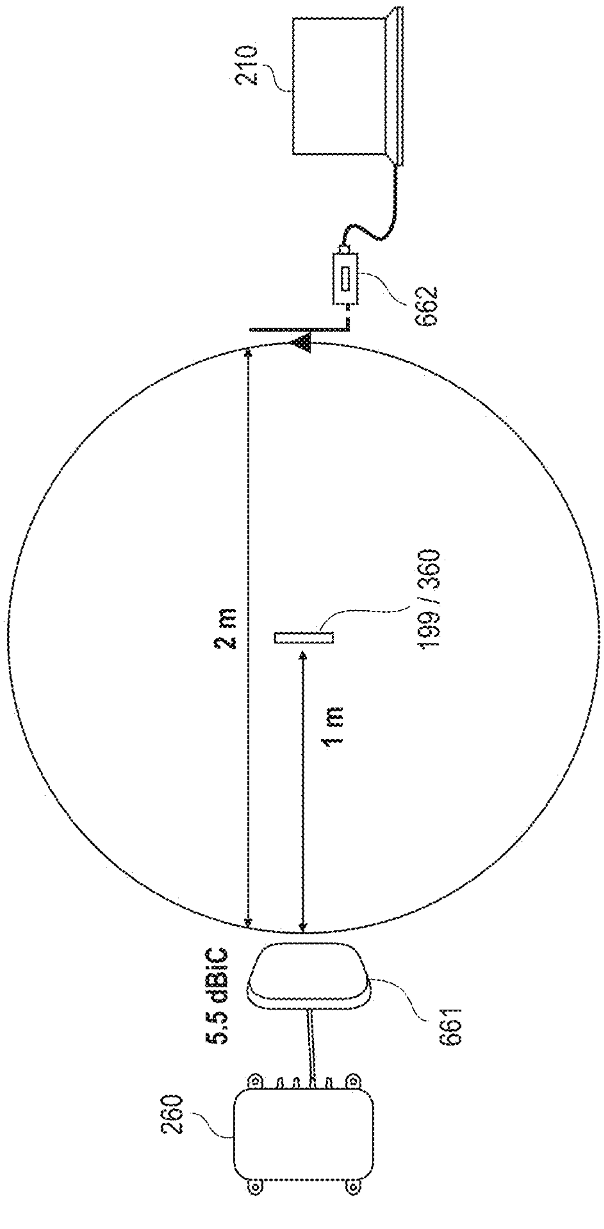

FIG. 6 is a representation of a basic Air Listener configuration.

Figure 7:
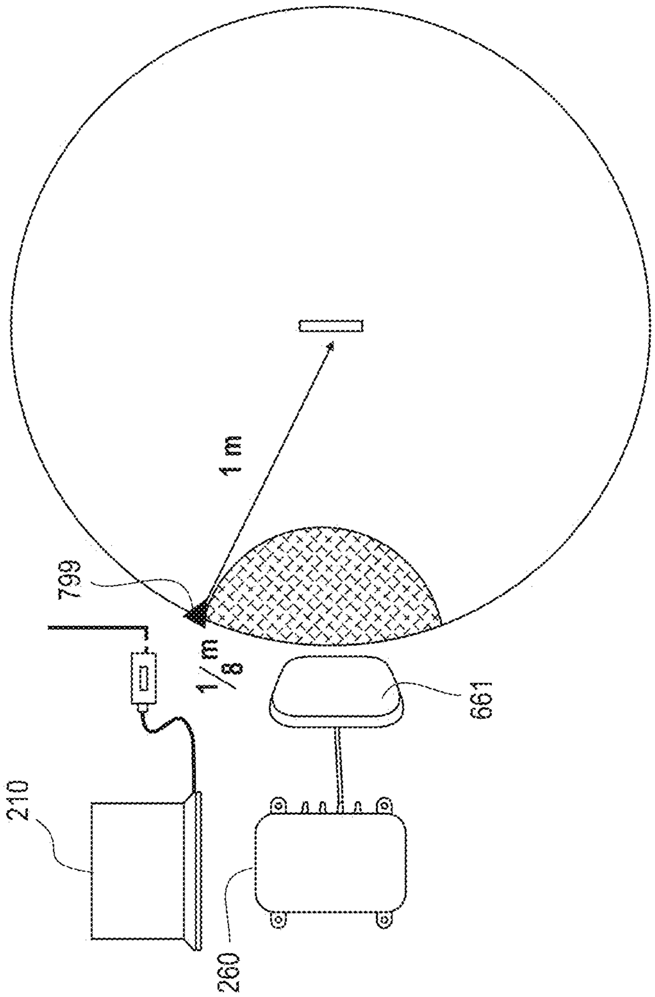

FIG. 7 is a representation showing the read range of a basic Air Listener configuration.

Figure 8:
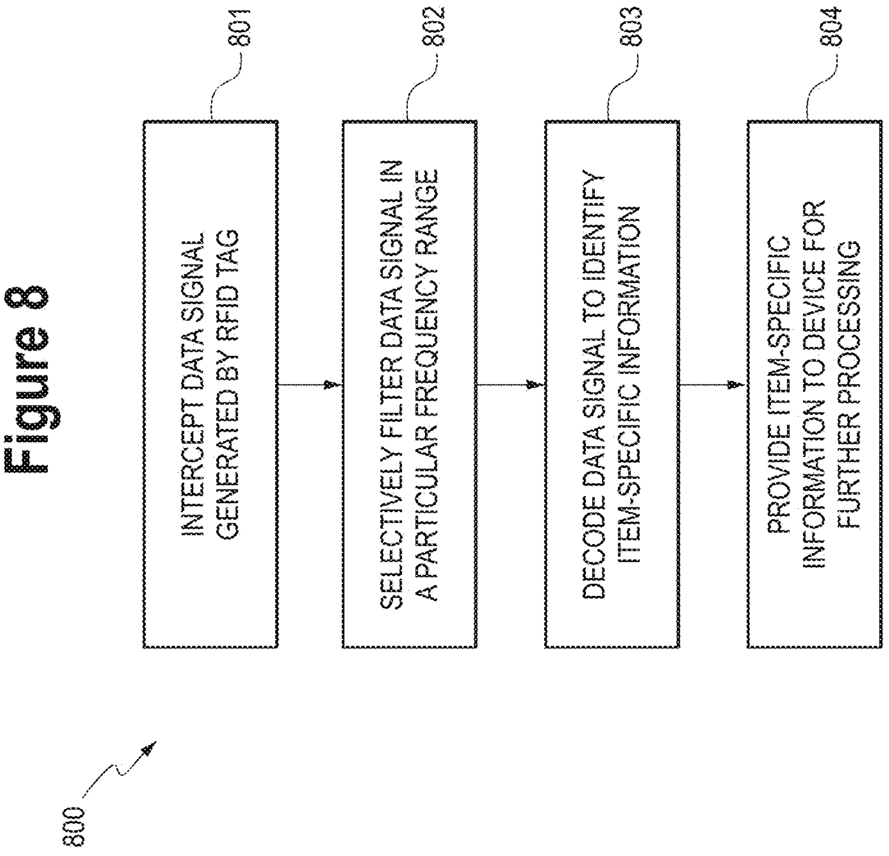

FIG. 8 is a flow diagram illustrating aspects of one method of acquiring item-specific information using an intercepted data signal.

SUMMARY

The following presents a simplified summary of the disclosure in order to provide a basic understanding of some aspects of various embodiments disclosed herein. This summary is not an extensive overview of the disclosure. It is intended neither to identify key or critical elements of the disclosed embodiments nor to delineate the scope of those embodiments. Its sole purpose is to present some concepts of the disclosed subject matter in a simplified form as a prelude to the more detailed description that is presented later.

Consumer-used or consumer-based devices, particularly mobile devices, that in their native or conventional state or configuration are not able to intercept and decipher/decode radio frequency (RF) signals, but upon modification as described herein can intercept an RF signal from one or more excited/interrogated RFID tags, systems containing the same, and methods of use thereof, are described herein. In some embodiments, the device is a consumer-used or consumer-based handheld device or headset, such as a cell/mobile phone, tablet, smartwatch, other mobile or wearable smart device, etc. In other embodiments, the device is a fixed device, e.g., that is permanently affixed to, or resides on, a surface, such as in a retail location or other appropriate location. In the context of the present disclosure, therefore, it will be appreciated that the term "consumer-used or consumer-based devices" (or just "consumer device" or "device," as the context requires) is intended to encompass any of the foregoing devices that are employed or operated by consumers, and therefore is intended to include familiar products such as handheld devices, headsets, and wearable electronics, e.g., a cellular, satellite, or other mobile telephone, a tablet or laptop computer, a personal digital assistant, a smartwatch, or other mobile or wearable smart device, or any fixed device that is affixed to, integrated with, resides on, or is used in connection with a surface, kiosk, control panel, or other structure (such as in a retail location or other appropriate location where interrogation of RFID tags may have utility), or any electronic component embodied in or comprising any of the foregoing, either independently or in combination.

In some embodiments, the device is modified to include a software controller. In some embodiments, the software controller modulates or controls (e.g., limits) the functionality of the antenna to receive only and deciphers and decodes the intercepted RF signal generated by an interrogated RFID tag or label. This component is shown as "software controls" (also referred to as "software controller") in FIG. 2. By modifying the functionality of the mobile device to receive only, a signal from an RFID tag (e.g., RFID UHF Gen2 tag) that is currently excited/interrogated by an RFID exciter/reader will transmit a signal that can be received and deciphered/decoded by the mobile (or fixed) consumer device.

In some embodiments, the software controller modulates the filtering of the receiver to collect the targeted frequency and for data communication. Exemplary types of data that can be communicated include or are related to, but are not limited to, electronic product codes (EPCs), other product data, brand authentication/anti-counterfeit data, theft-prevention alarms/notifications, etc. Once the data is collected, the device deciphers/decodes the data into data transmitted by the RFID tag. The data can be stored on the device itself, on a local device, such as a laptop computer, a desktop computer, a tablet, etc., at the retail location or other suitable location, or in the cloud or another accessible data repository, such as a connected product cloud, e.g., atma.io offered by Avery Dennison.

In some embodiments, software within the device (mobile or fixed) recognizes the signal (e.g., EPC signal) modulation between the RF transponder and the exciter/reader. The software identifies the modulation it is looking for and excludes other signal modulations and other RF signals outside of the defined thresholds that may include, but is not limited to, signal strength, frequency, and modulation. In some embodiments, the software is as designed above, and the software may further include machine learning to adapt to an environment and modify the thresholds to improve performance and efficiencies. In some embodiments, the software is as designed above, and the software leverages cloud data to support thresholds settings. In some embodiments, the software is as designed above and the software modifies the behavior of the receiving antenna.

In other embodiments, software within the device (mobile or fixed) recognizes the signal (e.g., EPC signal) as a BLE signal sent by the exciter/reader. The exciter/reader receives the EPC from the transponder (RFID tag) and broadcasts the EPC as a BLE signal. The software within the device receives the BLE signal. Once the data is collected, the device leverages local or cloud data to display other metadata. Metadata can be stored on the device itself, on a local device, such as a laptop computer, a desktop computer, a tablet, etc., at the retail location or other suitable location, or in the cloud or another accessible data repository, such as a connected product cloud, e.g., atma.io offered by Avery Dennison. Other signal types may also be used, including, but not limited to, UHF Gen2, BLE, WiFi, and/or UWB. In an alternative embodiment the signal type is collected as it is transmitted between an exciter and a transponder wherein the exciter operates at the same signal type. In some embodiments, the second signal type is used by a consumer to purchase an item of commerce at a point of sale (POS).

In some embodiments, the device with software and/or hardware measures at least RF noise, population of RFID tags in the read space, and/or personal preferences of the user, inclusive of the conditions described above. In some embodiments, the device may communicate with the RF exciter(s) (reader(s) that are in close range via known or standard data communication protocols, such as Bluetooth, WiFi, WAN, IR or other known methods to communicate environmental conditions or setting recommendations to the exciter/reader. The exciter/reader thereby receives the setting recommendations and/or the environmental conditions communication and modifies the settings within the reader to compensate for the environment. Such settings might be power level, Gen2 reader mode, session, tag filtering by EPC, Gen2 A and B tag state management, or other known RF reader device settings to respond to environmental conditions inclusive of but not limited to RF noise. In other embodiments, the reader is reading the RFID tag's unique ID via RF and broadcasting the unique ID via bluetooth/BLE. In some embodiments, the device is a conventional cell phone which contains a component for intercepting RF signals and a bluetooth/BLE component.

Systems containing the devices, and using the methods, described herein are also described. In some embodiments, the system contains an RFID reader or exciter that initiates communication with an RFID transponder. The reader/exciter sends an RF communication/signal to the transponder/tag, which in turn backscatters a return signal along a communication path. The mobile device has a tunable receiver, tuned by the software controller, that intercepts communication along its path.

The RFID reader can be any RFID reader known in the art including, but not limited to, fixed readers, such as overhead readers, smart shelves, etc. or mobile readers, such as handheld readers. The RFID reader can also be a low cost device, e.g., exciter, that initiates the signal interaction along a path, but does not perform otherwise more complex and/or expensive tasks, such as software, storage of data, socket communication, etc. that a conventional RFID reader would do.

Signals traveling on the data path are typically governed by standard communication protocols including, but not limited to, Gen2 UHF, WiFi, Bluetooth (e.g., BLE), LAN, IR, etc. These signals may be heard/detected by other communication devices, such as cell/mobile phones, tablets, etc. Attachment devices could be made to work with existing devices, such as mobile phones. Software-defined communications of existing hardware to leverage standard phone components to intercept the data on communication path and receive that data on handset are included herein.

Methods for intercepting item-level or item-specific data, such as EPCs or other product data, using the devices and systems described herein, are also disclosed. In some embodiments, the method includes using the mobile or fixed device described herein to intercept a RF signal sent by an RFID tag that has been excited or interrogated by an RFID reader or exciter. The interception can be accomplished using the software controller, alone or in combination with hardware/software.

The foregoing and other aspects of various disclosed implementations will be apparent through examination of the following detailed description thereof in conjunction with the accompanying drawing figures.

In accordance with some aspects of the disclosed subject matter, a device may generally comprise: a modem to enable bi-directional data communication with a remote system in accordance with a near field communication protocol; a transmitter operative in cooperation with the modem to transmit data to the remote system; a receiver operative in cooperation with the modem to receive a data signal from the remote system; an antenna driver operative in cooperation with the modem selectively to tune an antenna to receive the data signal from the remote system in a particular frequency range; and a software controller, wherein the software controller is configured and operative to modulate a filtering operation at the receiver such that the receiver collects and decodes the data signal in one or more targeted radio frequency (RF) bands produced by an interrogated RFID tag. Devices are disclosed further comprising a digital controller configured and operative to handle signal processing procedures including one of: converting the data signal between analog and digital; RF filtering and signal conditioning at low band frequencies under a selected frequency threshold; and equalization and correction of the data signal to account for multipath effects. Such a device may further comprise a clock generator configured and operative to control a voltage used to power the device.

In some implementations, the software controller is configured and operative to limit the functionality of the receiver to receive only. Embodiments are disclosed wherein the device is selected from the group consisting of a cellular or mobile telephone, a tablet computing device, or a smart watch, wherein the data signal comprises an electronic product code (EPC), wherein the data signal further comprises additional item-specific data associated with an item to which the RFID tag is affixed, and wherein the additional item-specific data comprises brand authentication information.

In accordance with other aspects of the disclosed subject matter, a system generally comprises: a device such as described herein; and an RFID reader configured and operative to excite the interrogated RFID tag such that the interrogated RFID tag generates the data signal. Implementations are disclosed, wherein the reader is selected from the group consisting of an overhead reader, a tunnel reader, a handheld reader, a smart shelf, a robot reader, or combinations thereof, and wherein the reader is an exciter.

In accordance with other aspects of the disclosed subject matter, a method of reading a radio frequency (RF) data signal generated by an interrogated radio frequency identification (RFID) tag affixed to an item or product, uses a device and generally comprises: employing the device to intercept the data signal generated by the RFID tag; responsive to the employing, selectively filtering the received data signal in a particular frequency range; and decoding the data signal to identify item-specific information. Some such methods are disclosed, wherein the device is selected from the group consisting of a cellular or mobile telephone, a tablet computing device, or a smart watch, wherein the item-specific information is an electronic product code (EPC), and wherein the device intercepts the data signal for a plurality of products.

Some methods are disclosed, wherein the item-specific information is compared to known data for a particular item, and wherein the known data are hosted at a remote location or locally at the device. Some such methods are disclosed, wherein the known data are hosted at a network-accessible remote data store, and wherein the known data are hosted in, or on, a connected product platform. In some disclosed methods, the item-specific information is compared to the known data via a standard communication protocol. Additionally or alternatively, in some methods, the standard communication protocol is selected from the group consisting of Gen2 UHF, WiFi or BLE.

In accordance with still other aspects of the disclosed subject matter, a method generally comprises: intercepting a data signal generated by an RFID tag; responsive to the intercepting, selectively filtering the received data signal in a particular frequency range; decoding the data signal to identify item-specific information; and providing the item-specific information to a device for subsequent processing. Some such methods are disclosed, wherein the providing comprises transmitting the item-specific information to a device selected from the group consisting of a cellular or mobile telephone, a tablet computing device, or a smart watch, and in some instances, the providing comprises transmitting an electronic product code (EPC). In accordance with some methods, the device intercepts the data signal for a plurality of products.

Methods are disclosed, further comprising comparing the item-specific information to known data for a particular item, and wherein the known data are hosted at a remote location or locally at the device; additionally or alternatively, the known data are hosted at a network-accessible remote data store. As with other implementations noted above, the selectively filtering may generally comprises filtering a frequency range selected from a set of frequencies used by one of Gen2 UHF, WiFi, and BLE.

DETAILED DESCRIPTION

Consumer-used or consumer-based devices that can intercept a radio frequency (RF) signal from one or more (e.g., a plurality) interrogated radio frequency identification (RFID) tags or labels, systems containing the same, and methods of using thereof are described herein. In some embodiments, the consumer-used or consumer-based device intercepts the RF signal from one or a plurality of objects. The device, or the data repository with which the device makes known data associations, can provide a user interface to allow the consumer to select the product of interest to the consumer from a plurality of products.

I. Devices

Devices for intercepting radio frequency (RF) communications are described herein. In some embodiments, the devices are used by consumers to obtain information about a product in a retail location. In some embodiments, the device is a mobile handset, such as a cell/mobile phone, tablet, smartwatch, etc. In other embodiments, the device is a fixed device that intercepts the signal as described herein. In still other embodiments, the device is a wearable device, such as a smart watch, smart glasses, smart headphones, etc.

RFID readers, such as ultra-high frequency (UHF) Gen2 readers, send and receive transmissions at the same time.

Figure 1:
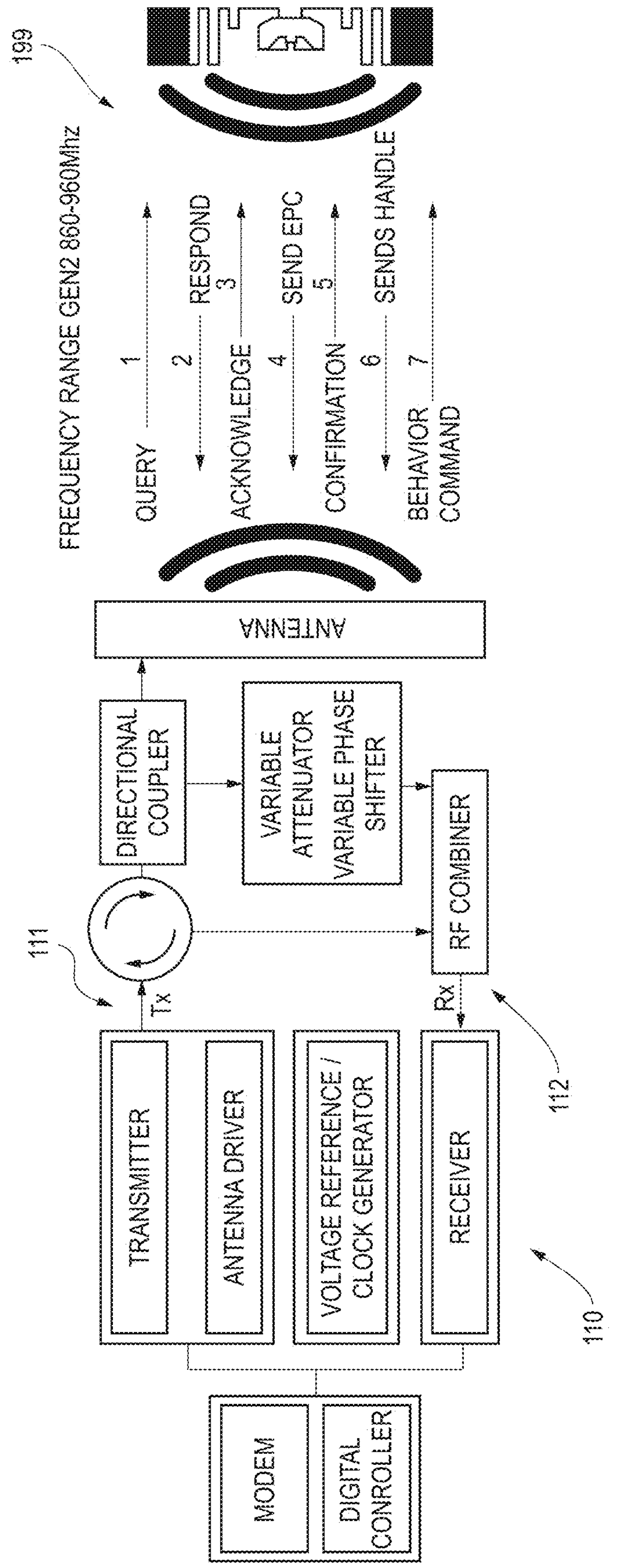
FIG. 1 is a schematic showing the interrogation of an RFID reader with an RFID tag or label associated with an item or product.

The receiving antenna is fully powered while receiving transmission from the transponder. This is most commonly performed on the same antenna but can use bi-static antenna configurations (a send antenna and a receive antenna). A schematic of an RFID reader and how it interacts with an RFID tag for item level association is shown in FIG. 1. The reader 110 contains the various components shown on the left side of FIG. 1. The right side of FIG. 1 shows an RFID tag 199 and its interaction with the reader 110. The reader 110 sends a query (reference numeral 1) to excite or interrogate the tag 199. For passive RFID tags, this query (1) provides the necessary energy to wake up the tag 199 and allow it to communicate with the reader 110. The RFID tag 199 sends a response signal (reference numeral 2). The reader 110 sends an acknowledgement signal (reference numeral 3). The tag 199 sends the EPC and/or other item or product information (vendor code, country of manufacture code, etc., as indicated at reference numeral 4). The reader 110 sends a confirmation signal (reference numeral 5). The RFID tag 199 sends a handle (reference numeral 6). The reader 110 sends a behavior command (reference numeral 7).

A conventional mobile handset, such as a cell/mobile phone, tablet, smart watch, etc. contains all of the components to the left of Tx (reference numeral 111) and Rx (reference numeral 112) in FIG. 1. However, such devices do not contain the components illustrated at the right of Tx 111 and Rx 112 in FIG. 1.

The devices described herein leverage a mobile device or handset (e.g., phone, tablet, smart watch, etc.) and/or fixed device to receive frequency shifts at a known frequency bandwidth without a transmitting device native on, or to, the device. An additional device with a transmitter and receiver may be used to initiate the protocol with the transponder.

A. Mobile Device Components

Any consumer-based mobile or wearable device or a fixed device can be used in the devices described herein. In some embodiments, the consumer-based mobile device is a mobile phone or cellular phone. In other embodiments, the mobile or wearable device is a smartwatch or tablet.

Figure 2:
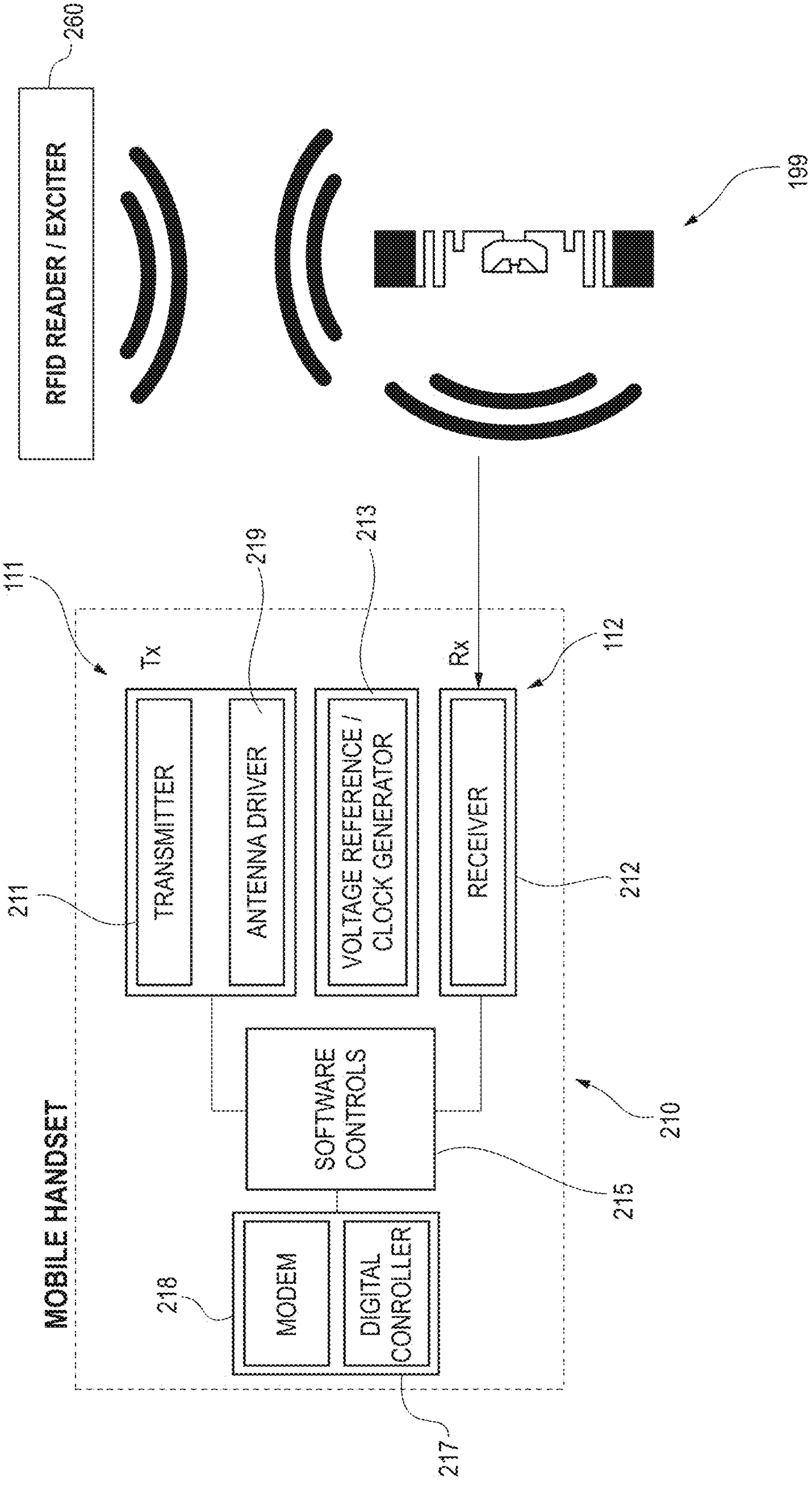
FIG. 2 is a schematic showing the components of a mobile device, such as a mobile phone or cell phone, and its interaction with the RF signal generated by an interrogated RFID tag or label.

FIG. 2 is a schematic showing the components of a typical mobile or cellular phone. Typical modern cell phones (e.g., smart phones), such as illustrated at reference numeral 210, contain an internal modem 218 which is functional if the user subscribes to a compatible service plan. Cell phone 210 can connect to nearby devices via wired (e.g., USB) or wireless (e.g., WiFi, Bluetooth (BTE)) communication protocols. Cell phone 210 may also contain a receiver 212 and a transmitter 211, which receives and transmits, respectively, radio frequency signals. The antenna driver 219 controls or modulates the antenna (not shown in FIG. 2). The cell phone 210 further contains a digital controller 217 that handles all signal processing. Examples of signal processing include converting signals between analog and digital, radio frequency filtering and signal conditioning at the lower frequencies, and equalization and correction for multipath effects. Finally, the cell phone 210 contains a voltage reference/clock generator 213 which manages the voltage used to power the cell phone 210.

B. Software Controls/Controller

The devices described herein further contains software controls (also referred to a "software controller" as indicated at reference numeral 215 in FIG. 2) which limits the functionality of the antenna to receive only and deciphers/decodes the intercepted signal generated by an interrogated RFID tag or label. By modifying the functionality of the mobile device 210 to receive only, a signal (e.g., from a RFID UHF Gen2 tag) that is currently excited/interrogated by an RFID reader (such as 110 or 210) will transmit a signal that can be received and deciphered/decoded by the mobile (or fixed) device 210.

The software controller 215 modulates or controls the filtering of the receiver 210 to collect the targeted frequency and data communication. Once the data is collected, the device 210 deciphers/decodes the data into the EPC/product data transmitted by the RFID tag 199. The EPC/product data can be stored on the device 210 itself, on a local device, such as a laptop computer, a desktop computer, a tablet, etc. or in the cloud or another accessible data repository.

In some embodiments, software within the handheld device, smart phone, fixed receiving device, etc. (reference numeral 210) recognizes the EPC signal modulation between RF transponder and the exciter/reader (reference numeral 260). The software (reference numeral 215) identifies the modulation it is looking for and excludes other signal modulations and other RF signals outside of the defined thresholds that may include, but are not limited to, signal strength, frequency, and modulation.

In some embodiments, the software 215 is as designed above, and the software 215 may further include machine learning to adapt to an environment and modify the thresholds to improve performance and efficiencies. In some embodiments, the software 215 is as designed above, and the software 215 leverages cloud data to support thresholds settings. In some embodiments, the software 215 is as designed above and the software 215 modifies the behavior of the receiving antenna.

In some embodiments, the device 210 with software 215 and/or hardware measures at least RF noise, population of RFID tags in the read space, personal preferences of the user, inclusive of these and other environmental conditions. The device 210 may communicate with the RF exciter(s) or reader(s) (such as indicated at reference numeral 260) that are in close range via Bluetooth, WiFi, WAN, IR or other known method to communicate environmental conditions or setting recommendations to the exciter/reader 260. The exciter/reader 260 thereby receives the setting recommendations or receives the environmental conditions communication and modifies the settings within the reader to compensate for the environment. Such settings might be power level, Gen2 reader mode, session, tag filtering by EPC, Gen2 A and B tag state management, or other known RF reader device settings to respond to environmental conditions inclusive of but not limited to RF noise.

In other embodiments, software 215 within the device (mobile or fixed) 210 recognizes the signal (e.g., EPC signal) as a BLE signal sent by the exciter/reader 260. The exciter/reader 260 receives the EPC from the transponder (RFID tag 199) and broadcasts the EPC as a BLE signal. The software 215 within the device 210 receives the BLE signal. Once the data is collected, the device 210 leverages local or cloud data to display other metadata. Metadata can be stored on the device 210 itself, on a local device, such as a laptop computer, a desktop computer, a tablet, etc., at the retail location or other suitable location, or in the cloud or another accessible data repository, such as a connected product cloud, e.g., atma.io offered by Avery Dennison. Other signal types may also be used, including, but not limited to, UHF Gen2, BLE, WiFi, and/or UWB. In an alternative embodiment, the signal type is collected as it is transmitted between an exciter 260 and a transponder wherein the exciter 260 operates at the same signal type. In some embodiments, the second signal type is used by a consumer to purchase an item of commerce at a point of sale (POS).

II. Systems

Figure 3:
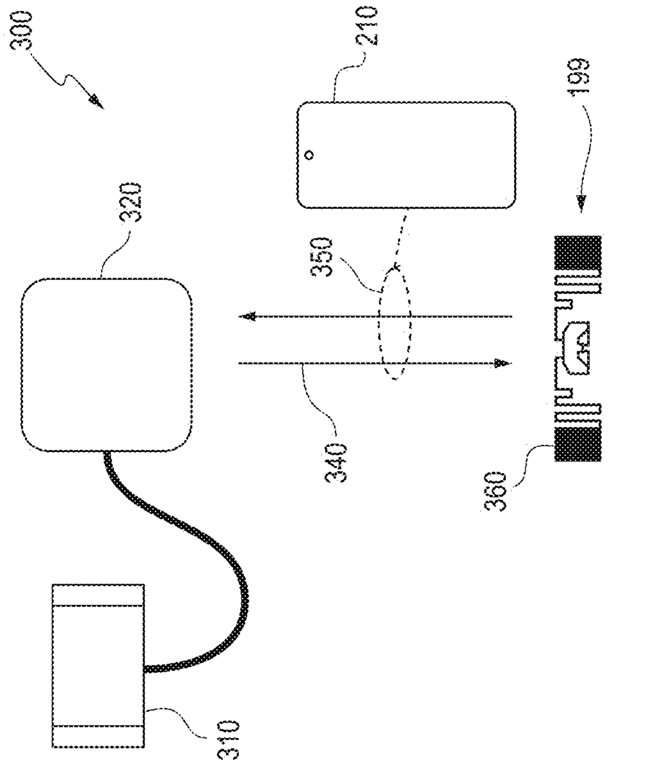
FIG. 3 is a schematic showing the components of a mobile device, such as a mobile phone or cell phone, and its interaction with the RF signal generated by an interrogated RFID tag or label.

Systems containing the devices, and using the methods, described herein are also contemplated. A schematic of a representative system is shown in FIG. 3. In some embodiments, the system 300 contains an RFID reader or exciter (reference numeral 310) that initiates communication with an RFID transponder (360) (also known as an RFID tag 199). The reader/exciter 310 sends an RF communication/signal (reference numeral 340) to the transponder/tag 199, which in turn backscatters a return signal along the communication path indicated at reference numeral 350. The mobile device 210 has a tunable receiver 212, tuned by the software controller 215, that intercepts communication 350 along its path as indicated in FIG. 3.

The RFID reader 310 can be any RFID reader known in the art including, but not limited to, fixed readers, such as overhead readers, smart shelves, etc. or mobile readers, such as handheld readers. The RFID reader 310 can also be a low cost device, e.g., exciter, that initiates the signal interaction along path 340 but does not include complicated elements or perform otherwise more complex and/or expensive tasks, such as software, storage of data, socket communication, etc. that a conventional RFID reader would do.

Signals traveling on data path 340 are typically governed by standard communication protocols. Standard communication protocols are known in the art and include, but are not limited to, WiFi, Bluetooth (e.g., BLE), etc. These signals can be heard by other communication devices, such as cell/mobile phones, tablets, etc. (reference numeral 210). Attachment devices could be made to work with existing devices, such as a mobile phone 210. Software defined communications of existing hardware to leverage standard phone components to intercept the data on communication path 350 and receive that data on handset 210 are included herein.

Figure 4:
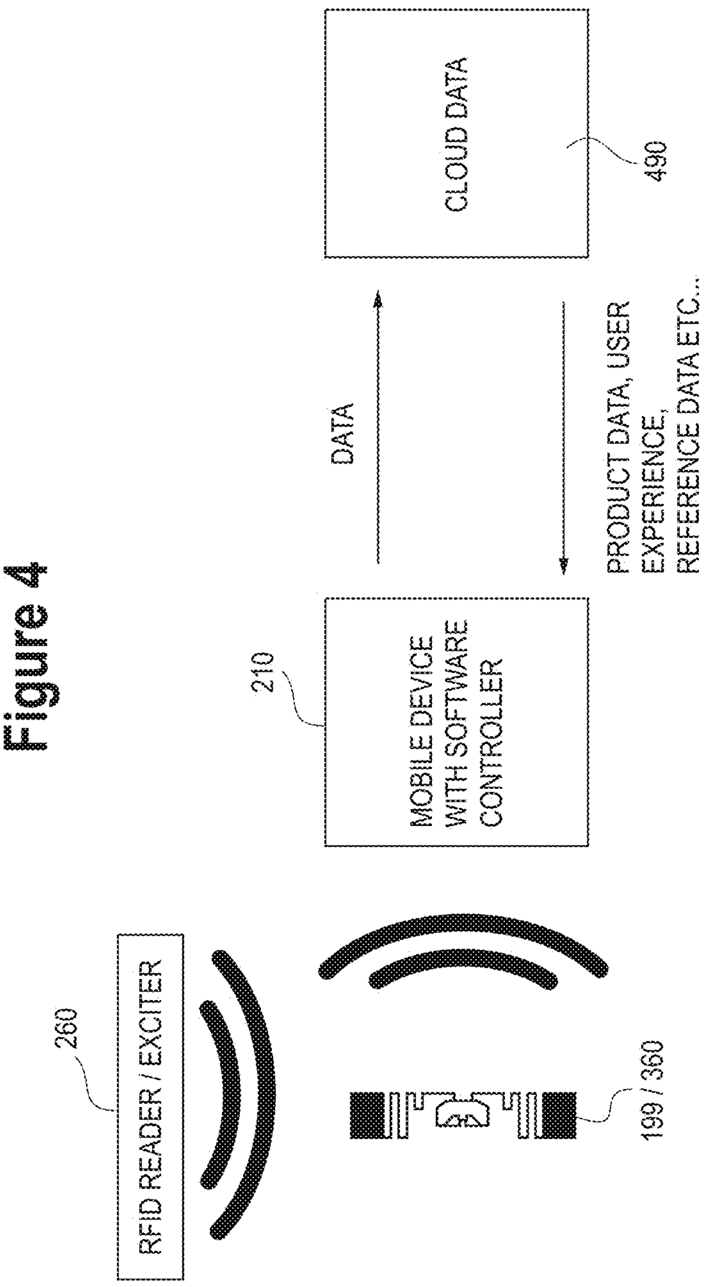
FIG. 4 is a schematic showing the referencing of the intercepted data for an item or product with known data for the item or product.

As discussed above, the data collected from the RFID tag 199/360 can be associated with known data about the item or product, such as the EPC or other product data. This association can occur on the device 210 itself, hosted locally (e.g., laptop, desktop, or tablet in the retail location), or via cloud-based application, such as a connected product cloud. The EPC/product data is referenced with known data associations in the cloud, locally on the device 210, and/or other accessible data repositories via standard data communication protocols, e.g., WiFi, BLE, etc. A schematic of an exemplary known data association is shown in FIG. 4. An RFID reader/exciter 260 interrogates an RFID tag 199/360 which generates an RF signal which is intercepted by a device 210 as described herein. The device 210 sends data to a data repository, such as a connected product cloud or other cloud-based application (reference numeral 490). The cloud-based application 490 then sends product data, customer engagement experiences, reference data, etc. to the consumer via device 210.

III. Methods of Intercepting Data

Methods for intercepting item-level or item-specific data, such as EPCs or other product data, using the devices and systems described herein, are also disclosed. In some embodiments, the method includes using the mobile/wearable or fixed device 210 described herein to intercept a RF signal sent by an RFID tag 199/360 that has been excited or interrogated by an RFID reader or exciter 260.

Figure 5A:
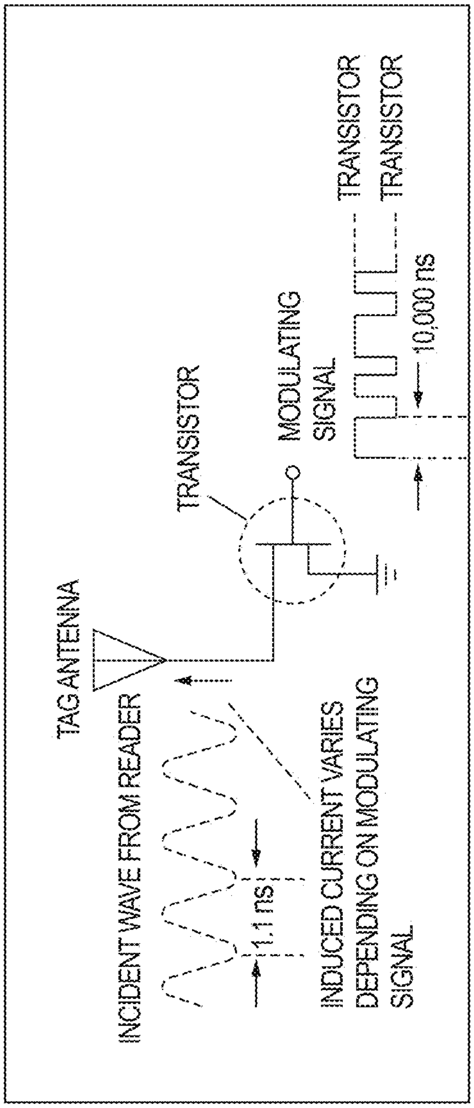
Figure 5B:
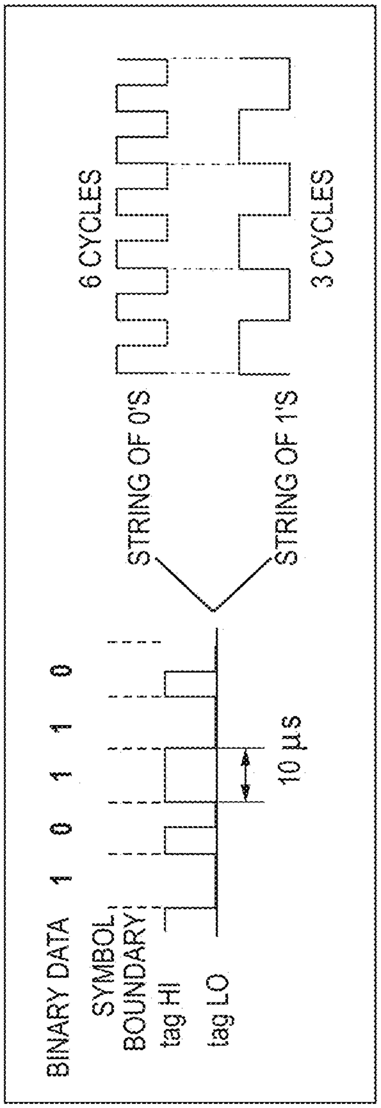

FIG. 5*a* is a schematic showing that the RF signal generated by the RFID tag 199/360 carries a pattern that is directly related to a unique identification (ID) encoded on or within the RFID tag 199/360. All unique RFID tag IDs are variations of frequency-shift keying (FSK). The frequency noted here is not the frequency generated by the reader 260, e.g., 900 MHz, but rather the tag (baseband) frequency, e.g., 100-200 kHz. A binary "1" might be coded by having the tag flip its state 100 times/millisecond and a binary "0" might have 50 flips/millisecond (FIG. 5*b*). Because the frequency being changed is the frequency at which a carrier is being amplitude modulated, techniques like this are sometimes known as subcarrier modulation.

EXAMPLES

Example 1. Exemplary Air Listener Device

A software defined radio (SDR) with similar specifications to production cell phone chips having air listening functionality was built and tested. The device achieved an over-the-air detection of one (1) meter from the tag 199/360 and two (2) meters from an antenna 661 of the reader 260 with a reporting latency of less than a second. Based on these results, it is expected that a cell phone 210 soft radio using a 10-bit analog-to-digital converter (ADC) with a 3 mega-samples per second (MSPS) sample rate, a center frequency tunable from 902-928 MHZ, and a 10 dB boise figure can decode Max Miller RFID tag back scatter (EPCs) at least one (1) meter from the tag and two (2) meters from the reader 260 on a fixed channel.

Example 2. Verification of Read Range

A Speedway R700 (e.g., exciter 260) transmitting at 22 dBm connected to a Laird S9025PR 5.5 DbiC antenna (reference numeral 661) was mounted on a tripod at one (1) meter from an Avery Dennison (AD)-237r6 tag 199/360 and two (2) meters from a 2 dBiL antenna (mounted on another tripod), reference numeral 662, connected to the SDR/computer combination Air Listener™ (such as may be employed at a device 210). The setup is shown in FIG. 6. The Air Listener successfully detected the singulated tag 199/360 with this baseline setup, and with the Air Listener located at various points in within the two meter diameter circle, the singulated tag 199/360 was also detected. This makes intuitive sense: within the one meter radius of the circle, the Air Listener antenna is closer to the tag 199/360 than the baseline scenario and thus receives a stronger signal.

A link budget analysis of the signal levels reveals the robustness of the baseline scenario in the tables below (in which Table I shows link budget information for a reader, Table II shows link budget information for a tag, and Table Ill shows noise level information for an Air Listener implementation):

TABLE I

| Link budget, reader signals | Value |
|---|---|
| Reader TX power | 22 dBm |
| Reader antenna gain | 5.5 dBI |
| Cable loss | −1 dB |
| Path loss@2 m $\left(Friis: \frac{\lambda^2}{(4\pi R)^2}\right)$ | −37.7 dB |
| Air Listener RX gain | 2 dB |
| Air Listener RX reader power | −9.2 dBm |

TABLE II

| Link budget, tag signals | Value |
|---|---|
| Reader TX power | 22 dBm |
| tag TX $\Delta\Gamma = 0.7$ | −2 dBI |
| Cable loss | −3 dB |
| Path loss@1 m $\left(Friis: \frac{\lambda^2}{(4\pi R)^2} \times 2\right)$ | −63 dB |
| Air Listener RX gain | 2 dB |
| Air Listener RX reader power | −44 dBm |

TABLE III

| Noise level, Air Listener Thermal noise factors | Value |
|---|---|
| Noise figure @ max LNA gain | 3.5 dB |
| LNA Gain reduction (noise figure ↑) | 7 dB |
| Bandwidth 6 MHz | 68 dB |
| Thermal noise density | −174 dBm/Mhz |
| Thermal noise power | −96 dBm |
| 12b ADC noise power (max signal: 9 dBm) | −65 dBm |
| Air Listener RX noise power | −65 dBm |

For the configured Air Listener receiver gain settings, the maximum signal that the ADC can accommodate is +9 dBm. The reader signal power at the Air Listener is-9.2 dBm so it is within the available ADC dynamic range. Also, the tag signal power at the Air Listener is-44 dBm, above the receiver noise floor of −65 dBm. While it is possible to reduce the receiver gain of the Air Listener to accommodate larger signals as it approaches the reader antenna 661, the illustration in FIG. 7 shows why the Air Listener can detect the singulated tag 199/360 at most points within the two meter diameter circle. Assuming an omnidirectional beam pattern from the reader antenna 661 and neglecting near-field effects, the received reader signal amplitude almost never goes above the top end of the ADC dynamic range of +9 dBm (represented by the hatched area where the power at the Air Listener ADC begins to exceed the maximum input signal level). A sample location where the signal is approximately +9 dBm is represented by the triangular area at the corner of the hatched area (reference numeral 799). See FIG. 7. Nevertheless, because of the high signal-to-noise ratio between the Air Listener tag signal and the noise floor with the baseline SDR gain settings, in principle, the gains of the SDR could be reduced to increase the maximum signal level and shrink the hatched region further.

As noted above, FIG. 8 is a flow diagram illustrating aspects of one method of acquiring item-specific information using an intercepted data signal. As indicated in FIG. 8, such a method 800 may begin by intercepting a data signal such as may be generated by an RFID tag, for example (see block 801). The data signal may be selectively filtered in a particular or desired frequency range (see block 802).

It is noted that a device such as illustrated and described herein may be suitable for the operations depicted at blocks 801 and 802. For instance, a cell phone such as depicted at reference numeral 210 may contain RF components (such as receiver 212 and transmitter 211 operative in cooperation with an antenna, e.g., under control of antenna driver 219 such that software, hardware, and electronic processing resources may control or modulate the antenna to receive only data signals within a particular or desired frequency (i.e., a bandpass filter may be implemented selectively to filter the data signal at block 802). As noted above in connection with FIG. 2, examples of signal processing that may be represented at blocks 801 and 802 include converting signals between analog and digital, RF filtering and signal conditioning at certain frequencies, and equalization and correction for multipath effects.

In the foregoing manner, i.e., by modifying the functionality of the antenna to receive only, and by selectively filtering inbound RF signals, a data signal (e.g., from a RFID UHF Gen2 tag) may be received and deciphered/decoded by a device (such as device 210) that may not have been specifically designed for that purpose. In that regard, the method 800 may continue with decoding the data signal to identify item-specific information as indicated at block 803. As noted above, any of various item-specific types of data may be communicated via data signals such as described herein (including RFID signals). Such item-specific data may be application-specific or otherwise dependent upon the overall functionality sought to be provided by a system (such as system 300); in general, these item-specific data may include or may be related to EPCs, other product data, brand authentication or anti-counterfeit information, theft-prevention data related to alarms or notifications, and the like, generally as a design choice related to operational characteristics of system 300. Upon interception of the data signal in the selected frequency band, the device (such as device 210) may then store such item-specific data on the device itself, on a local or remote device, such as a laptop computer, a desktop computer, a tablet, etc.; additionally or alternatively, the item-specific data may be stored at, i.e., transmitted or provided to, a point of sale terminal at a retail location, some other remote server or suitable distributed location, or in the cloud or another network-accessible data repository, such as a connected product cloud.

The foregoing operations are described above in detail with reference to FIGS. 1 through 3.

In addition to the storage feature noted above, it will also be appreciated that item-specific information may then be provided to appropriate resources at the device itself (such as device 210), or to one of the remote components noted above for further processing as indicated at block 804. Such further processing may include comparisons of item-specific information with known information, for instance, maintained in a database. Such processing may be embodied in or comprise, for example, inventory monitoring and management, track and trace, sustainability analyses (origin of raw materials, sustainable manufacturing processes, etc.), brand authentication or anti-counterfeiting, and theft-prevention, among others, and may ultimately be a design choice as a function of operation of system 300, for instance. Again, as noted above, such processing may be executed locally at a device such as device 210, or the processing at device 210 may include transmitting or providing the item-specific information to a different device (such as a computer or server) where the foregoing additional processing may be executed remotely.

It is noted that the arrangement of the blocks and the order of operations depicted in the drawing figures are not intended to exclude other alternatives or options. By way of example, the operations depicted at blocks 802 and 801 may be reversed in order in some circumstances involving antenna tuning. As other examples, it will be appreciated that the operations depicted at blocks 801 and 802, the operations depicted at blocks 802 and 803, or the operations depicted at blocks 803 and 804, may be made to occur substantially simultaneously in some implementations. Those of skill in the art will appreciate that the foregoing subject matter is susceptible of various design choices that may influence the order or arrangement of the operations depicted in the drawing figures, including without limitation, FIG. 8.

Several features and aspects of devices, systems, and methods have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the present disclosure be considered as limited only by the scope of the appended claims.

What is claimed is:

1. A device comprising:

a modem to enable bi-directional data communication with a remote system comprising an RFID reader, an RFID exciter, an RFID tag, a cloud server, or combinations thereof in accordance with near field communication protocol;

a transmitter operative in cooperation with the modem to transmit data to the remote system;

a receiver operative in cooperation with the modem to receive a data signal from the remote system;

an antenna driver operative in cooperation with the modem selectively to tune an antenna to receive the data signal from the remote system in a particular frequency range; and a software controller, wherein the software controller is configured and operative to modulate a filtering operation at the receiver such that the receiver collects and decodes the data signal in one or more targeted radio frequency (RF) bands produced by an interrogated RFID tag;

wherein the software controller is configured and operative to limit the functionality of the receiver to receive only the data signals in the one or more targeted radio frequency (RF) bands.

2. The device of claim 1, further comprising a digital controller configured and operative to handle signal processing procedures including one of: converting the data signal between analog and digital; RF filtering and signal conditioning at low band frequencies under a selected frequency threshold; and equalization and correction of the data signal to account for multipath effects.

3. The device of claim 2, further comprising a clock generator configured and operative to control a voltage used to power the device.

4. The device of claim 1, where the device is a consumer device.

5. The device of claim 1, wherein the device is selected from the group consisting of a cellular or mobile telephone, a tablet computing device, or a smart watch.

6. The device of claim 1, wherein the data signal comprises an electronic product code (EPC).

7. The device of claim 6, wherein the data signal further comprises additional item-specific data associated with an item to which the RFID tag is affixed.

8. The device of claim 7, wherein the additional item-specific data comprises brand authentication information.

9. The device of claim 1, wherein the device is handheld or mobile.

10. The device of claim 1, wherein the device is fixed.

11. A system comprising:

the device of claim 1; and an RFID reader configured and operative to excite the interrogated RFID tag such that the interrogated RFID tag generates the data signal.

12. The system of claim 11, wherein the reader is selected from the group consisting of an overhead reader, a tunnel reader, a handheld reader, a smart shelf, a robot reader, or combinations thereof.

13. The system of claim 12, wherein the reader is an exciter.

14. A method of reading a radio frequency (RF) data signal generated by an interrogated radio frequency identification (RFID) tag affixed to an item or product, wherein the method uses a device including a receiver, the method comprising:

employing a device comprising a receiver to intercept the data signal generated by the RFID tag and/or a reader;

responsive to the employing, selectively filtering the received data signal in a particular frequency range; and decoding the data signal to identify item-specific information;

wherein the functionality of the receiver is limited to receive only data signals in the particular frequency range.

15. The method of claim 14, wherein the device is selected from the group consisting of a cellular or mobile telephone, a tablet computing device, or a smart watch.

16. The method of claim 14, wherein the item-specific information is an electronic product code (EPC).

17. The method of claim 14, wherein the device intercepts the data signal for a plurality of products.

18. The method of claim 17, wherein the item-specific information is compared to known data for a particular item, and wherein the known data are hosted at a remote location or locally at the device.

19. The method of claim 18, wherein the known data are hosted at a network-accessible remote data store.

20. The method of claim 19, wherein the known data are hosted in, or on, a connected product platform.

21. The method of claim 18, wherein the item-specific information is compared to the known data via a standard communication protocol.

22. The method of claim 21, wherein the standard communication protocol is selected from the group consisting of Gen2 UHF, WiFi or BLE.

23. The method of claim 14, further comprising:

providing the item-specific information to a cellular or mobile telephone, a tablet computing device, or a smart watch for subsequent processing.

24. The method of claim 23, wherein the providing comprises transmitting the item-specific information to a device selected from the group consisting of a cellular or mobile telephone, a tablet computing device, or a smart watch.

25. The method of claim 23, wherein the providing comprises transmitting an electronic product code (EPC).

26. The method of claim 23, wherein the device intercepts the data signal for a plurality of products.

27. The method of claim 23, further comprising comparing the item-specific information to known data for a particular item, and wherein the known data are hosted at a remote location or locally at the device.

28. The method of claim 27, wherein the known data are hosted at a network-accessible remote data store.

29. The method of claim 23, wherein the selectively filtering comprises filtering a frequency range selected from a set of frequencies used by one of Gen2 UHF, WiFi, and BLE.

30. The method of claim 18, wherein the item-specific information is compared to the known data via a standard communication protocol.

31. The method of claim 30, wherein the standard communication protocol is selected from the group consisting of Gen2 UHF, WiFi or BLE.

32. The method of claim 18, wherein the item-specific information is compared to the known data via a standard communication protocol.

33. The method of claim 32, wherein the standard communication protocol is selected from the group consisting of Gen2 UHF, WiFi or BLE.

34. The method of claim 19, wherein the item-specific information is compared to the known data via a standard communication protocol.

35. The method of claim 34, wherein the standard communication protocol is selected from the group consisting of Gen2 UHF, WiFi or BLE.

36. The method of claim 20, wherein the item-specific information is compared to the known data via a standard communication protocol.

37. The method of claim 36, wherein the standard communication protocol is selected from the group consisting of Gen2 UHF, WiFi or BLE.

* * * * *